Jan. 23, 1945.  J. G. WALSH  2,368,056
SIGNALING SYSTEM
Filed Aug. 19, 1943  9 Sheets-Sheet 4

INVENTOR
J. G. WALSH
BY
R. O. Covell
ATTORNEY

Jan. 23, 1945.   J. G. WALSH   2,368,056
SIGNALING SYSTEM
Filed Aug. 19, 1943   9 Sheets-Sheet 5

INVENTOR
J. G. WALSH
BY
R. O. Covell
ATTORNEY

INVENTOR
J. G. WALSH
BY
R. O. Covell
ATTORNEY

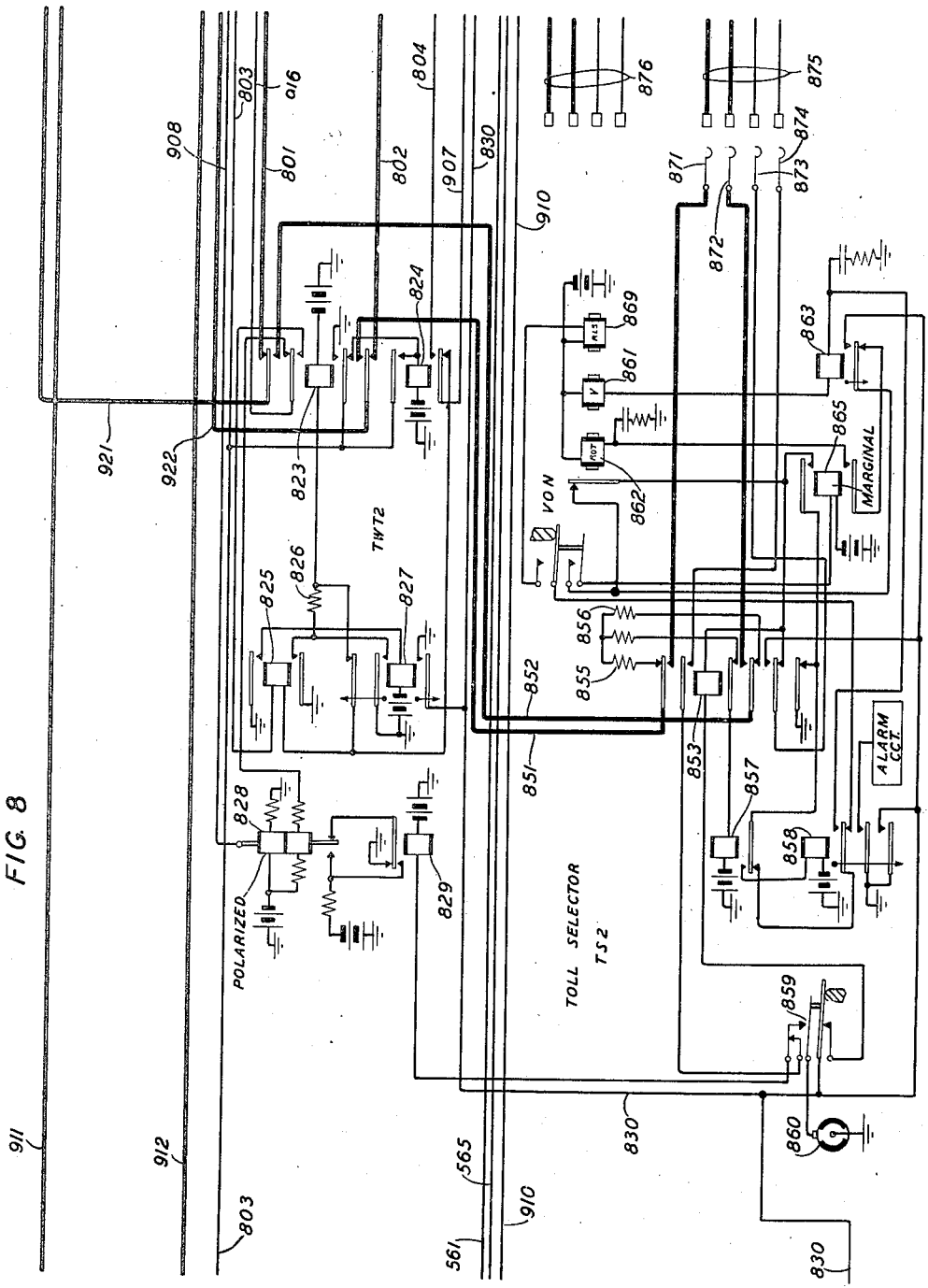

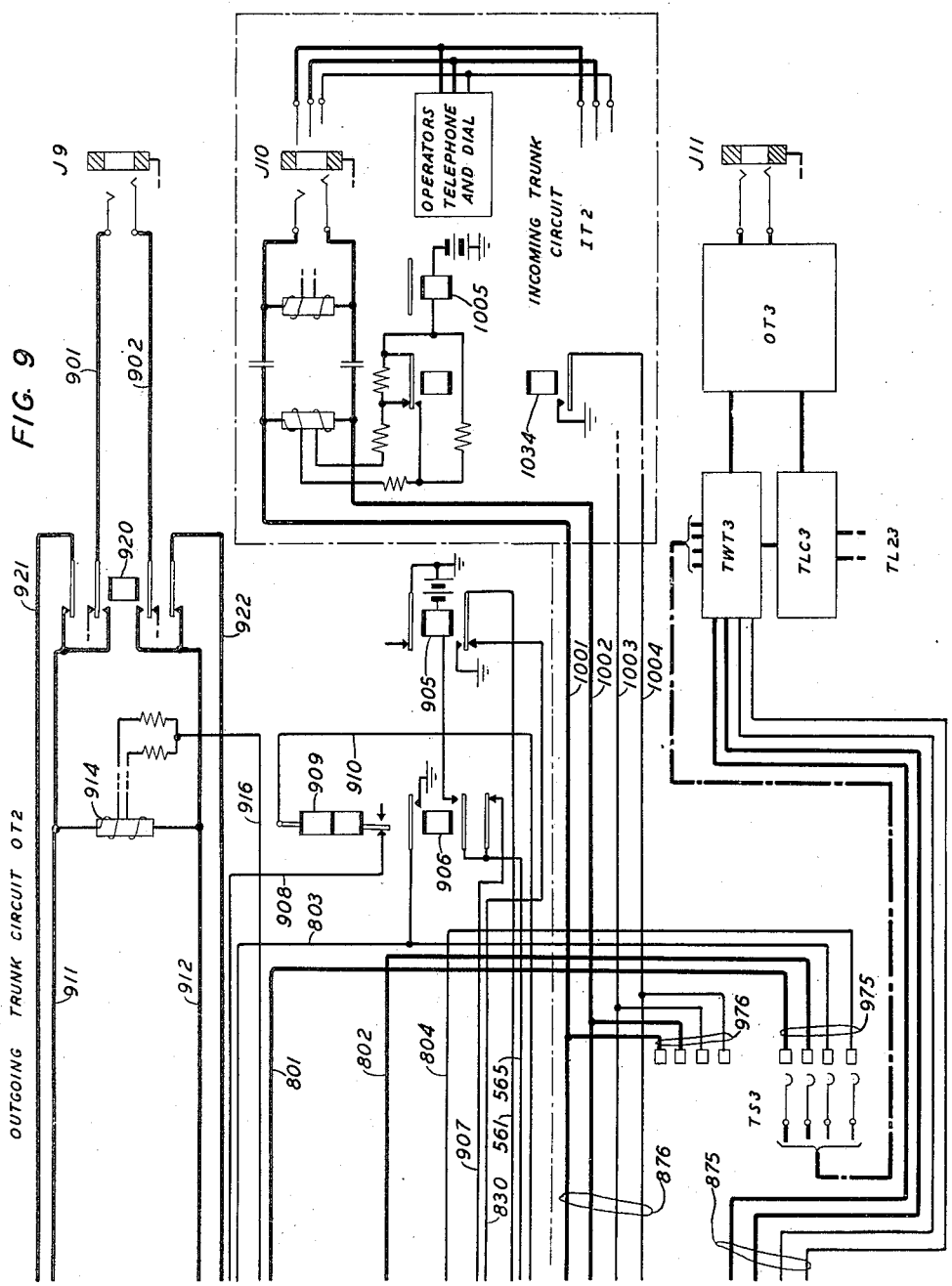

Patented Jan. 23, 1945

2,368,056

UNITED STATES PATENT OFFICE 2,368,056

SIGNALING SYSTEM

John G. Walsh, Newark, N. J., assignor to Bell Telephone Laboratories, Incorporated, New York, N. Y., a corporation of New York Application August 19, 1943, Serial No. 499,200

14 Claims. (Cl. 179—27)

This invention relates to signaling systems and particularly to systems in which voice frequency currents are used for the transmission of signals.

Objects of the invention are the provision of more reliable signal transmitting means in systems employing voice frequency signals and particularly the transmission of signals of a character which minimize the possibility of false operations in response to speech or other interference currents.

This invention is a signal transmitting means adapted to transmit signals each of which consists of a plurality of current impulses in succession, each current impulse of a signal being of a different one of three signaling frequencies. Seizure, selective, ringing and disconnect signals are transmitted on calls outgoing over the trunk or line with which the signal transmitting means is associated. Supervisory, off-hook and on-hook signals and disconnect acknowledgment signals are transmitted on calls incoming over the trunk or line with which the signal transmitting means is associated. A seizure signal transmitted on an outgoing call and an off-hook supervisory signal transmitted on an incoming call consist of an impulse of current of one of the signaling frequencies followed immediately by an impulse of current of another of the signaling frequencies. Selective signals corresponding to a train of dial impulses transmitted on an outgoing call consist of an impulse of current of the third of the signaling frequencies for the duration of each dial impulse and an impulse of current of said other of the frequencies for the duration of the interval between successive dial impulses of a train, the current impulse representing the first dial impulse being immediately preceded by a preparatory or enablement signal which is similar to a seizure signal. A disconnect signal transmitted on an outgoing call consists of the enablement signal followed by an impulse of current of the third of the signaling frequencies until a disconnect acknowledgment signal is received by the associated signal receiver if the acknowledgment signal is received within a predetermined interval; and, if the disconnect-acknowledgment signal is not received within said interval, the impulse of current of the third of the signaling frequencies ends and the disconnect signal then further consists of alternate impulses of current of the first and second of the signal frequencies followed by an impulse of current of the third frequency when a disconnect-acknowledgment signal is received by the associated signal receiver. An on-hook supervisory signal transmitted on an incoming call consists of an impulse of current of each of the first, second and third of the signaling frequencies in succession. A disconnect-acknowledgment signal transmitted on an incoming call consists of alternate impulses of current of the first and second of the signaling frequencies, the transmission of this signal being terminated responsive to the final impulse of a disconnect signal incoming to the associated signal receiver.

A clear and complete explanation of the invention will be facilitated by considering a system in which the invention and its various features are embodied, one such system being represented schematically in the drawings which form a part of this specification. The invention is not limited in its application to the particular system disclosed in the drawings but is generally applicable to any signaling system in which it is desirable to employ voice frequency currents for the transmission of signals.

Referring to the drawings:

Figs. 5 to 9 show, in the second toll office, a toll line circuit TLC2, signal receiver SR2, signal transmitter ST2, two-way trunk circuit TWT2, outgoing trunk circuit OT2, and a toll route selector TS2, all individually associated with the inter-toll trunk line TL12;

Figure 1:
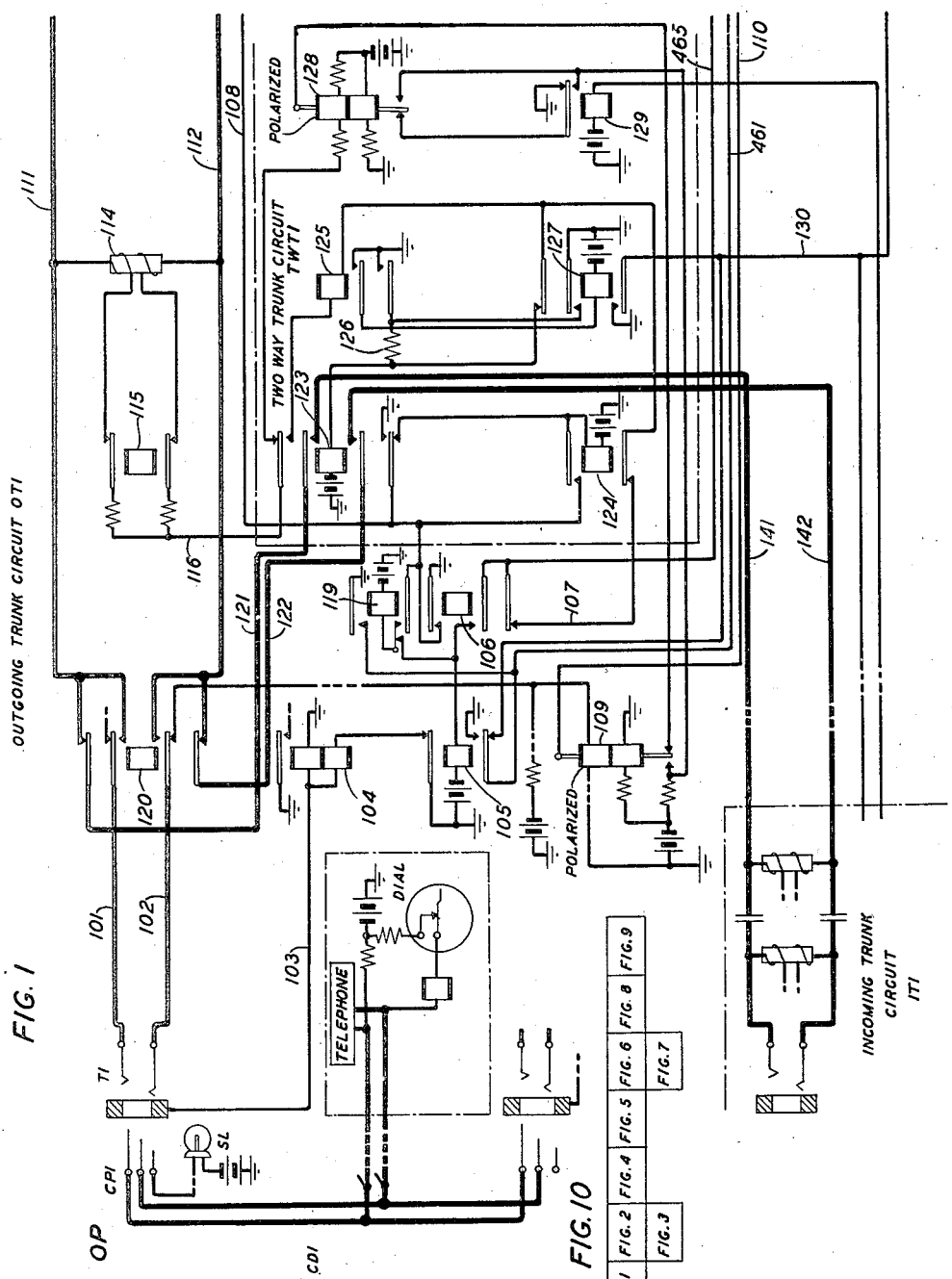
Figs. 1 to 4 show, in a first toll office, an operator's position OP, an outgoing trunk circuit OT1, a two-way trunk circuit TWT1, an incoming trunk circuit IT1, a toll line circuit TLC1, a signal transmitter ST1 and a signal receiver SR1, all individually associated with an intertoll trunk line TL12 extending to a second toll office.
Figure 2:
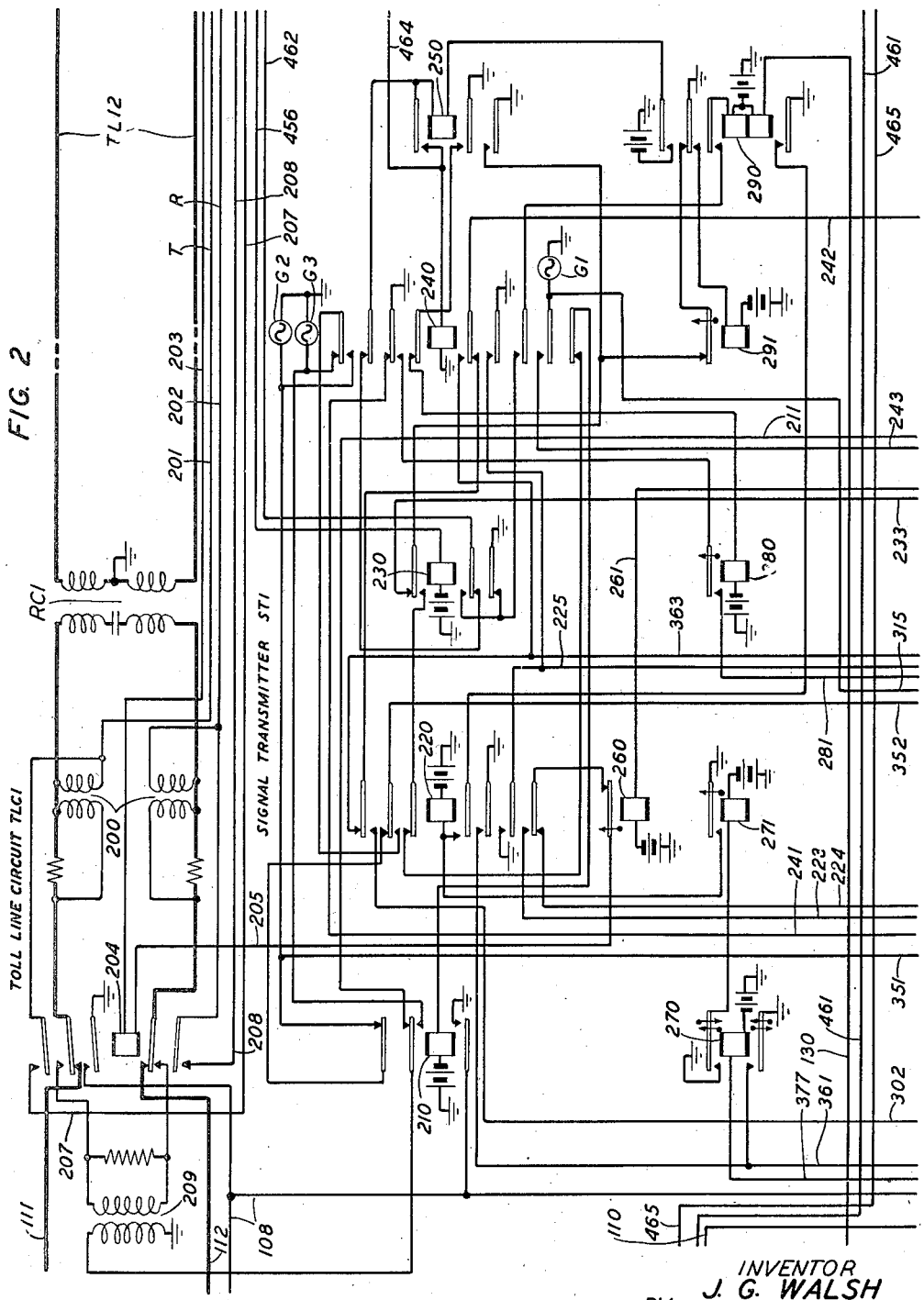
Figure 3:
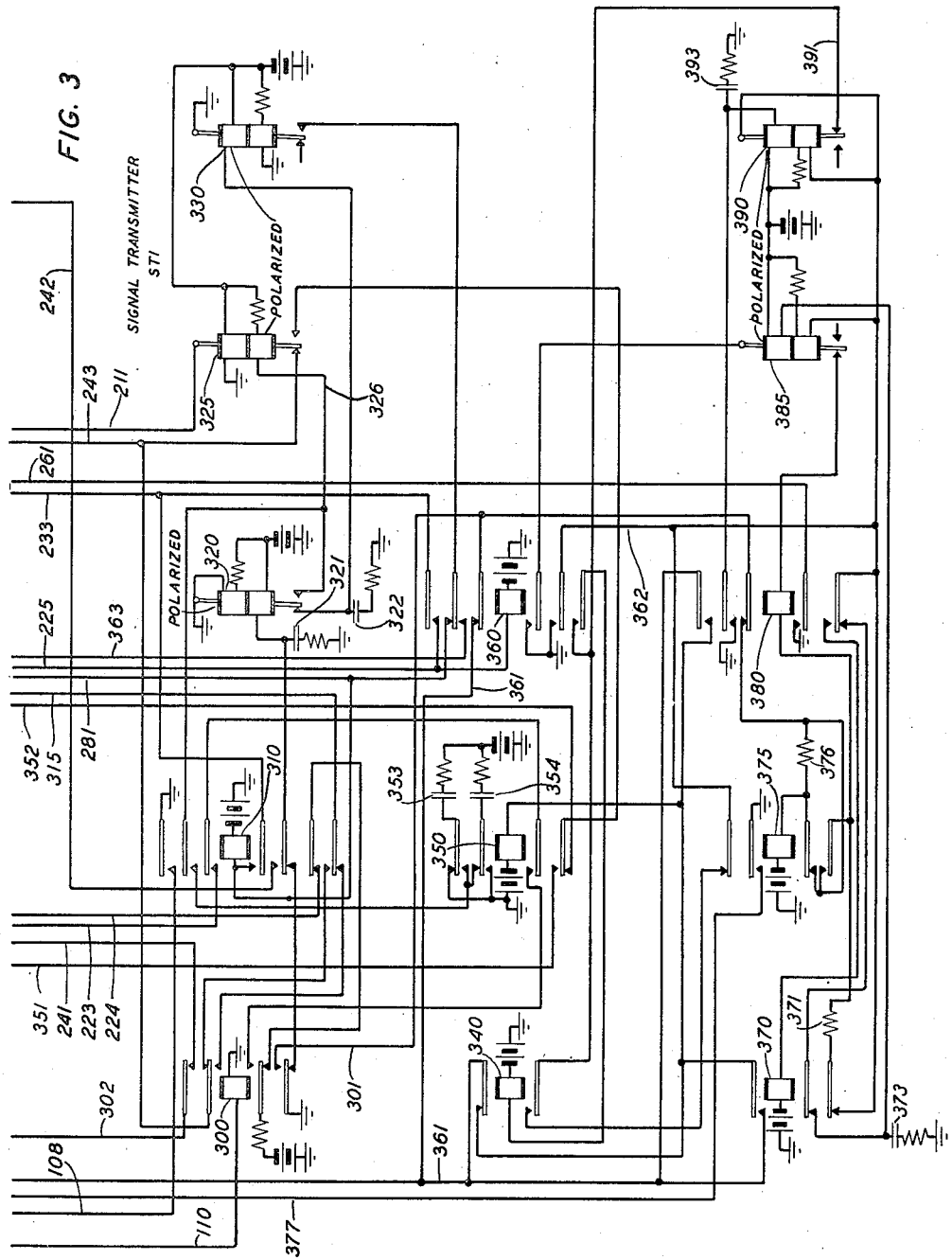
Figure 4:
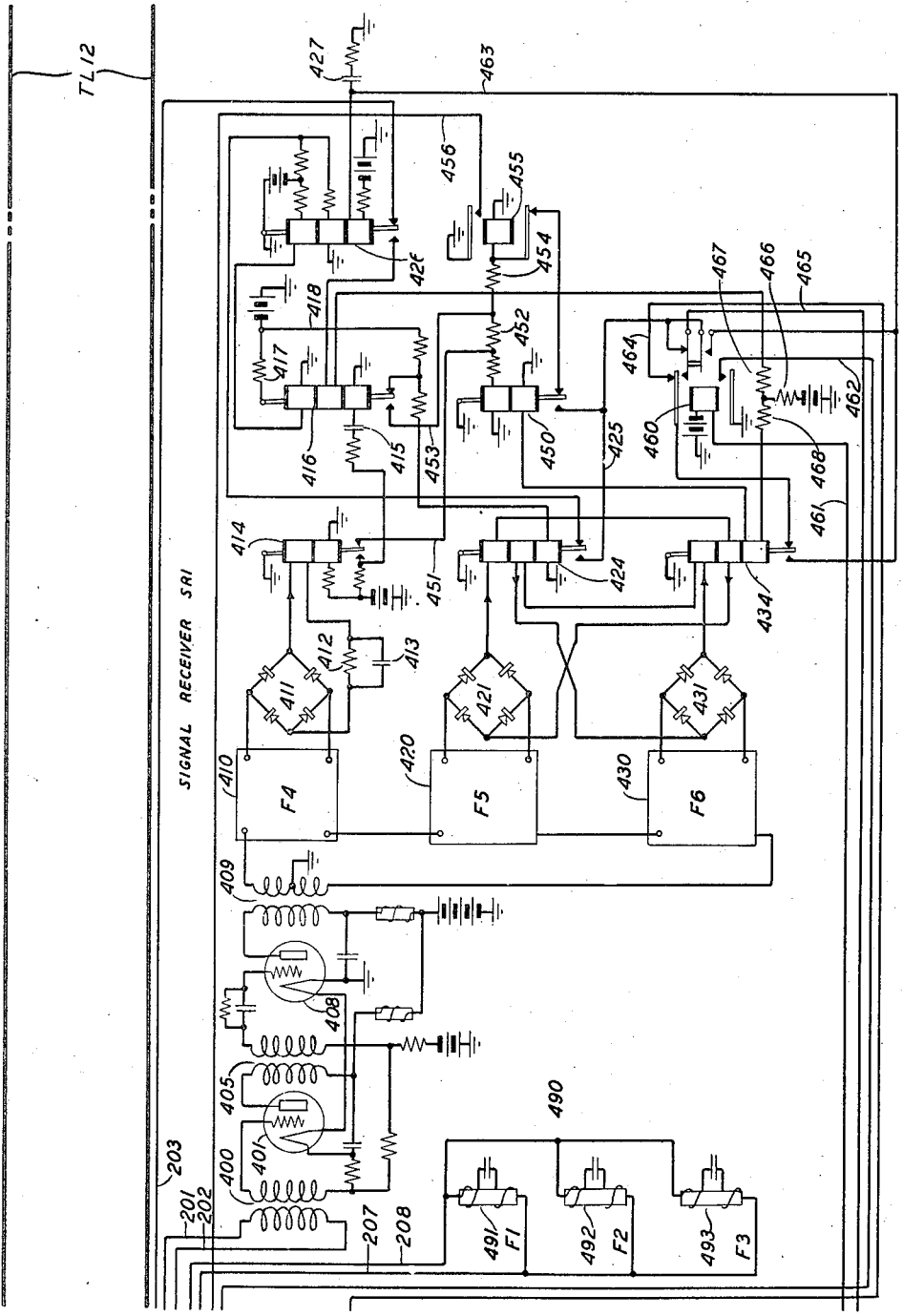
Figure 5:
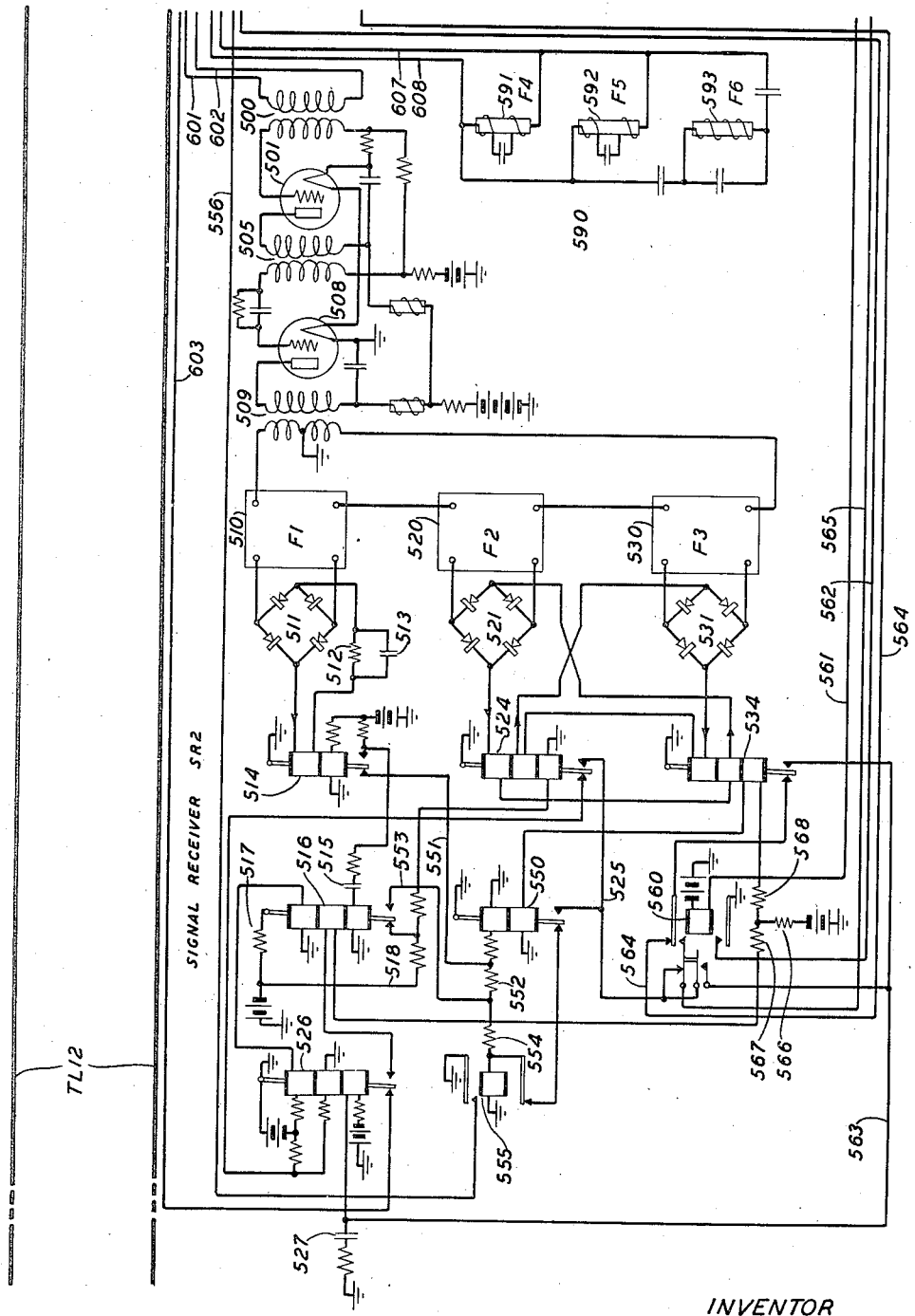
Figure 6:
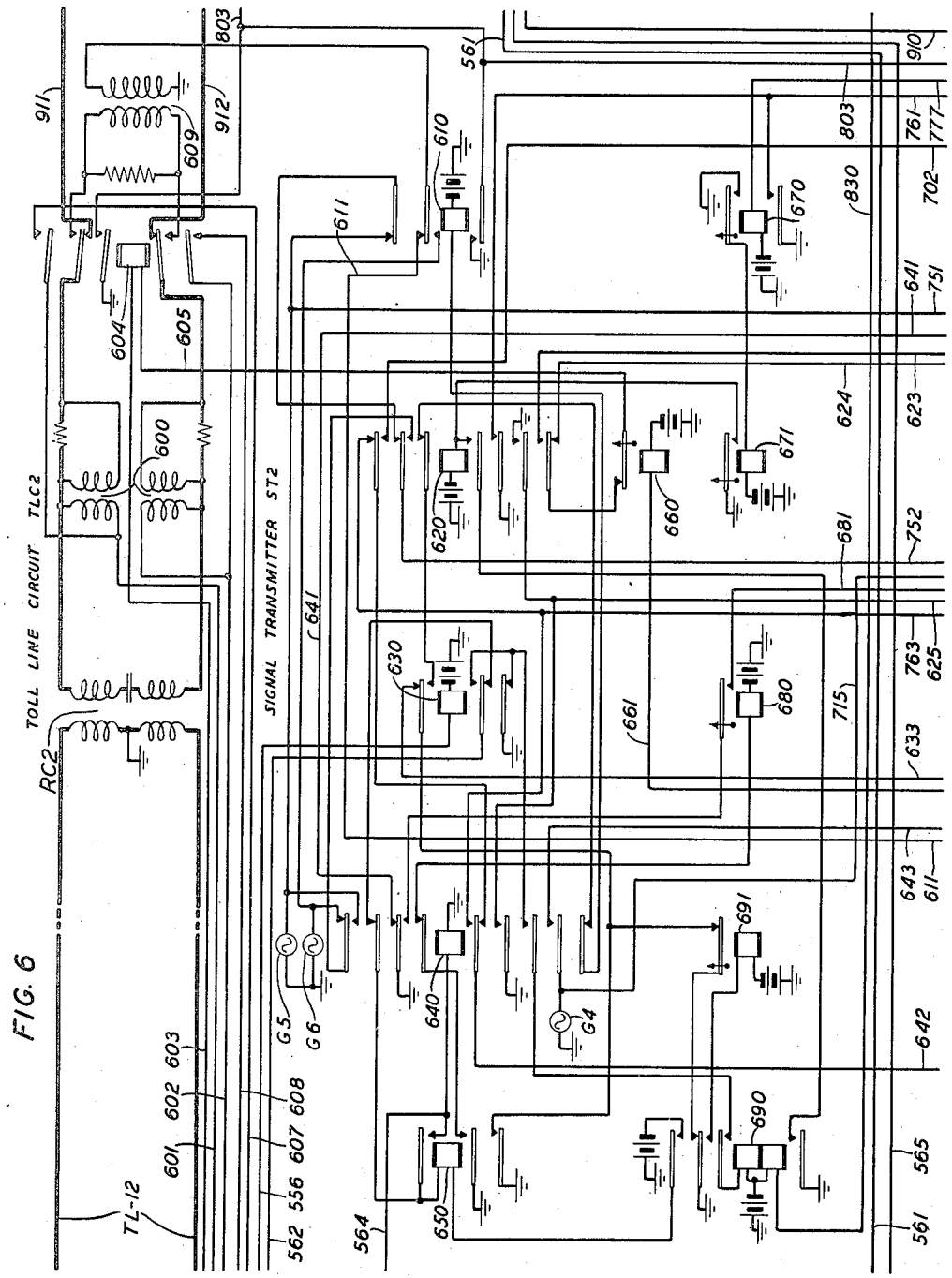
Figure 7:
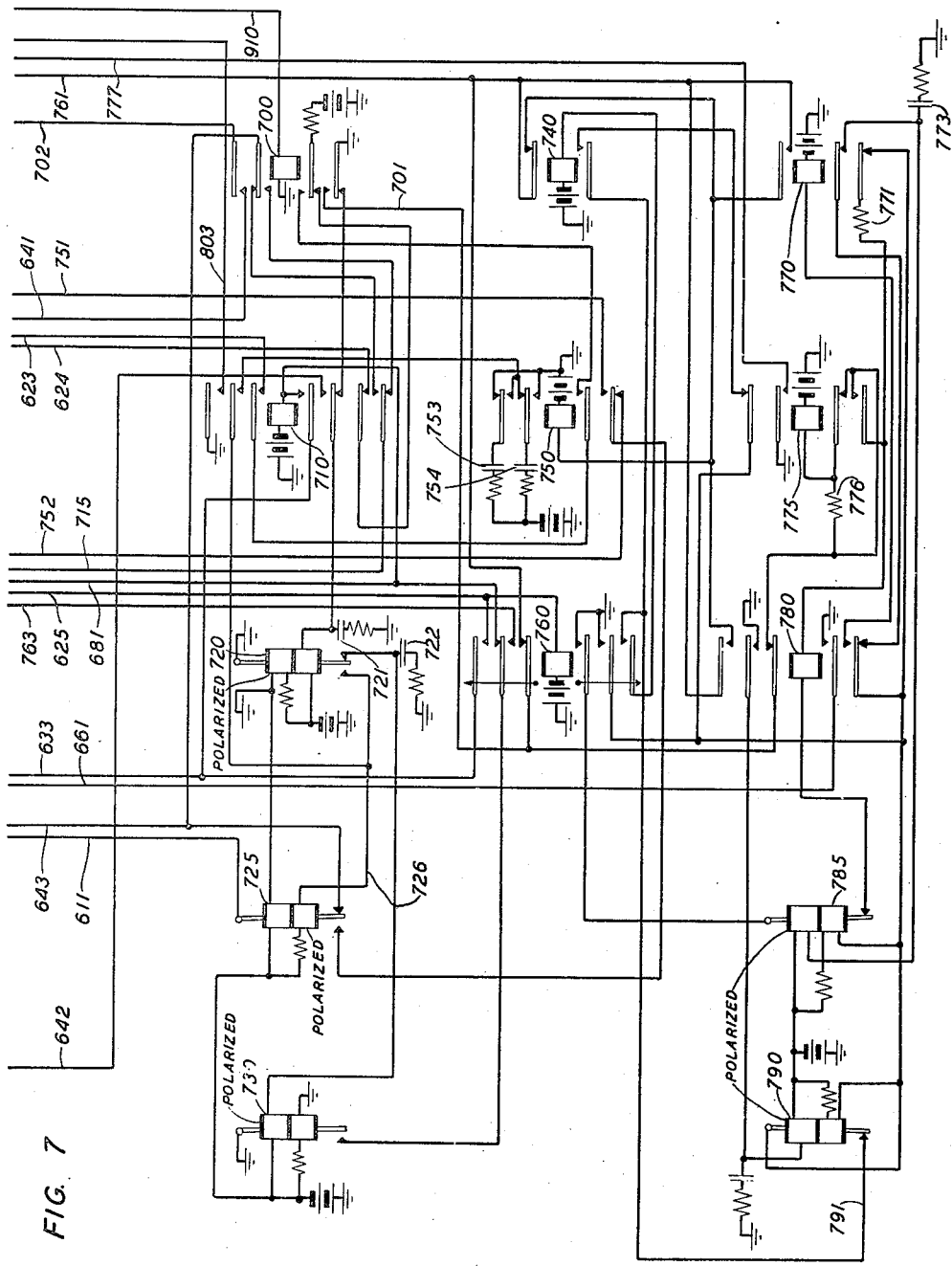

Fig. 9 further shows an incoming trunk circuit IT2 terminating at an operator's position, and shows an outgoing trunk circuit OT3, two-way trunk circuit TWT3, toll route selector TS3 and toll line circuit TLC3 associated with another intertoll trunk line TL23; and Fig. 10 shows the relative position in which Figs. 1 to 9 are to be placed to form an operative arrangement.

The system represented in the drawings includes a plurality of toll offices each of which comprises a toll board with operators' positions and cords for answering calls incoming from local manual and dial offices, from toll subscribers' lines, and from other toll offices and for extending incoming calls to switching trunks leading to called local manual and dial offices, to intertoll trunks and to called toll subscribers' lines. Outgoing jacks are directly connected to trunks to local offices, to toll subscribers' lines and to intertoll trunks. Answering jacks are directly connected to recording trunks, to toll subscribers' lines, to intertoll trunks and to incoming trunks terminating in the banks of toll route selectors. Toll route selectors are provided for use on incoming calls to establish connections with incoming trunk circuits and with trunks to other toll offices and to called local offices.

Reference may be had to the patent to R. E. King et. al., No. 2,209,777 granted July 30, 1940, for a detailed description of the cord and operator's position circuits provided in each of the toll offices for interconnecting calling and called lines and trunks and controlling the completion of toll calls. The outgoing trunk circuits OT1, OT2 and OT3, incoming trunk circuits IT1 and IT2, two-way trunk circuits TWT1, TWT2 and TW3 and the toll route selector circuits TS2 and TS3 are all similar to corresponding circuits of the aforementioned King et al patent. The toll line circuits TLC1 and TLC2 and the associated signal transmitting circuits ST1, ST2, are arranged for voice frequency signaling in accordance with applicant's invention; and the associated signal receiving circuits SR1 and SR2 are arranged for voice frequency signaling according to the invention described in the application of H. M. Pruden, Ser. No. 499,201, filed on even date herewith. The toll line circuit TLC3 and the associated signal transmitting and signal receiving circuits may be arranged for composite signaling as shown in the aforementioned King et al. patent or may be arranged for voice frequency signaling.

The toll line circuit TLC1 comprises a repeating coil RC1, a directionally selective coil 200, a cut-off relay 204 and an outgoing signal transformer 209. The cut-off relay 204 is normally operated to close a talking connection between the repeating coil RC1 and the talking conductors of the outgoing and two-way trunk circuits OT1 and TWT1. When released, relay 204 connects the outgoing signal transformer 209, through windings of coil 200, to the repeating coil RC1; and connects the filter unit 490 of the associated signal receiver SR1 to the input transformer 400 of signal receiver SR1. The toll line circuit TLC2 is similar to the toll line circuit TLC1, the reference characters applied to like elements having the same tens and units digits.

The signal transmitter ST1 comprises a signal receiving relay 300 controlled by relay 109 of outgoing trunk circuit OT1 on outgoing calls and controlled by relay 129 of two-way trunk circuit TWT1 on incoming calls. The transmitter ST1 further comprises sources G1, G2 and G3 of signaling currents of frequencies F1, F2 and F3 respectively, and a plurality of control relays of desired time characteristics to effect the transmission of the required signaling currents. The signal transmitter ST2 is similar to the transmitter ST1, except that the three sources of signaling current G4, G5 and G6 are of frequencies F4, F5 and F6 respectively. The reference characters applied to corresponding elements of signal transmitters ST1 and ST2 have the same tens and units digits.

The signal receiver SR2 comprises an incoming signal transformer 500, amplifiers 501 and 508, filters 510, 520 and 530 tuned to pass current of frequencies F1, F2 and F3 respectively, rectifiers 511, 521 and 531 and relays 514, 524 and 534 for response to signal impulses of frequencies F1, F2 and F3 respectively. The signal receiver SR2 further comprises auxiliary signal receiving relays 516, 526, 550, 555 and 560 for repeating the received signals in a direct current signaling circuit. The signal receiver SR2 further comprises a filter network 590 consisting of three sections 591, 592 and 593 respectively, tuned to the frequencies F4, F5 and F6, to prevent outgoing signal currents of these frequencies from interfering with the response of relays 514, 524 and 534 to incoming signals. The signal receiver SR1 is similar to the receiver SR2, except that it is arranged to respond to signal currents of frequencies F4, F5, and F6 and is arranged to prevent outgoing signals of frequencies F1, F2 and F3 from interfering with response to incoming signals. The reference characters applied to corresponding elements of signal receivers SR1 and SR2 have the same tens and units digits.

The three frequencies F1, F2 and F3 used for signaling in one direction over toll line TL12 differ from the three frequencies F4, F5 and F6 used for signaling in the other direction over toll line TL12. For instance, the sources G1, G2 and G3 associated with signal transmitter ST1 may transmit current of 600 cycles, 1600 cycles and 1400 cycles respectively; in which case the filters 510, 520 and 530 of signal receiver SR2 are tuned to pass currents of 600, 1600 and 1400 cycles respectively. And the sources G4, G5 and G6 associated with signal transmitter ST2 may transmit current of 1900 cycles, 900 cycles and 1100 cycles respectively; in which case the filters 410, 420 and 430 of signal receiver SR1 are tuned to pass currents of 1900, 900 and 1100 cycles, respectively.

Assume now that the operator at position OP in the first toll office has answered an incoming call with the plug AP1 of cord CD1 and that the plug CP1 is inserted in jack J1 to extend the call over toll line TL12 to the second toll office, relays 104, 106 and 109 of outgoing trunk circuit OT1 being thereby operated in the manner described in the aforementioned King et al. patent. The operation of relay 109 closes a circuit through conductor 110 for operating relay 300 of signal transmitter ST1; and the operation of relay 106 connects ground to conductor 100. The operation of relay 300 opens the normally closed circuit for operating the cut-off relay 204 of line circuit TLC1, this circuit being traced from battery through the inner lower back contact of relay 300, back contacts of relays 310, 220 and 260, winding of relay 204, conductor 203, to ground at the back contact of relay 426 of signal receiver SR1. The release of relay 204 connects the right winding of signal transformer 209 to the left windings of repeating coil RC1 and connects filter unit 490 to input transformer 400. The operation of relay 300 also closes a circuit including the inner upper back contact of relay 390 for operating relay 375 and closes a circuit including the inner upper back contact of relay 360 and the upper back contact of relay 340 for operating relay 350. The operation of relay 300 also closes a circuit from source G1 of signaling current of frequency F1 through the lowermost back contact of relay 310, inner upper front contact of relay 300, left contact of relay 325, inner upper back contact of relay 210, and left winding of transformer 209 to ground; and as soon as the cut-off relay 204 has released, signal current of frequency F1 is transmitted through transformer 209, back contacts of relay 204, left windings of directionally selective coil 200, and through repeating coil RC1 and toll line TL12 to the signal receiver SR2 in the second toll office. The aforementioned operation of relay 300 also opens the normally closed circuit through the lower winding of relay 320, the deenergization of this winding and actuation of the contacts of relay 320 being delayed for about .020 second by current charging condenser 321. The operation of relay 320 opens the normally closed circuit through the upper winding of relay 330, the deenergization of this winding and actuation of the contacts of relay 330 being delayed for about .020 second by current charging condenser 322. The operation of relay 320 also closes a circuit through the lower winding of relay 325 to effect the immediate operation of relay 325. The operation of relay 325 disconnects source G1 from, and connects source G2 to, the left winding of transformer 209 thereby ending the transmission of current of frequency F1 and initiating the transmission of current of frequency F2 over the toll line TL12 to the signal receiver SR2. When relay 330 operates, it closes a circuit including a back contact of relay 360 for operating relay 310. Relay 310 locks through its inner lower front contact, conductor 233, upper back contact of relay 230, and back contact of relay 291 to ground at a back contact of relay 290.

The aforementioned operation of relay 315 causes the successive operation of relays 270, 271 and 220. Relay 270 is slow in operating so that the operation of relay 220 occurs about .050 second after the operation of relay 300 and after the operation of relay 310. The operation of each of relays 270 and 220 connects ground through conductor 361 and the inner upper back contact of relay 360 to conductor 301 in parallel with the connection of ground to conductor 301 through the outer lower front contact of relay 300. The operation of relay 220 also closes a circuit from ground through a back contact of relay 240, conductor 241, uppermost contact of relay 300, conductor 302, uppermost front contact of relay 220, inner lower back contact of relay 240, conductor 242, a front contact of relay 310 and the lower winding of relay 320. The energization of the lower winding of relay 320 restores the contacts of relay 320 to normal, thereby causing the release of relays 325 and 330, the release of relay 330 being delayed by current charging condenser 322. The release of relay 325 disconnects the signaling current source G2 from the left winding of transformer 208 to end the current of frequency F2. The aforementioned operation of relay 220 also closes a circuit for operating relay 360; and relay 360 locks in parallel with relay 310 under the control of relays 230, 291 and 290. The operation of relay 360 opens the operating circuit of relay 310; disconnects conductor 361 from conductor 301; connects ground to the armature of relay 385; and closes a circuit for reoperating the cut-off relay 204, this circuit being traced through conductor 205, upper back contact of relay 260, lowermost front contact of relay 220, inner upper front contact of relay 310, inner lower front contact of relay 350 and the inner lower front contact of relay 300. The operation of relay 360 also connects ground to conductor 362 thereby causing the energization of both windings of relay 385 and the energization of the lower winding of relay 390. With both windings energized, the contacts of relay 385 remain in normal position, as shown in the drawings. The energization of the lower winding of relay 390 causes the operation of relay 390. The aforementioned connection of ground to conductor 362 also causes energization of the winding of relay 340; but relay 390 opens the circuit for operating relay 340 to prevent its operation at this time. Thus a seizure signal consisting of current of an impulse of current of frequency F1 for about .020 second followed immediately by an impulse of current of frequency F2 for about .030 second is transmitted responsive to the seizure of outgoing trunk circuit OT1 to effect the operation of the signal receiver SR2 as hereinafter described.

The seizure signal thus transmitted over toll line TL12 responsive to seizure of trunk circuit OT1 is further transmitted through repeating coil RC2, directionally selective coils 600, conductors 601 and 602, transformer 500, amplifier 501, transformer 505, volume limiting amplifier 508 and transformer 509 to the input side of each of filters 510, 520 and 530. The impulse of current of frequency F1 is further transmitted through filter 510 and rectifier 511 to effect the operative energization of the upper winding of relay 514. The operation of relay 514 opens the normally closed short-circuit across the upper winding of relay 550 and closes a circuit for discharging the normally charged condenser 515 thereby to energize the lower, operating winding of relay 516 in the same direction as its biasing winding. When the impulse of current of frequency F1 ends, relay 514 releases and the condenser 515 is again charged in series with the lower winding of relay 516, the direction of the charging current being such that relay 516 is operated for a predetermined interval of time. The operation of relay 516 opens the circuit through resistor 517 thereby to decrease the current through the lower, biasing winding of relay 524 to render relay 524 operatively responsive to current of frequency F2. The operation of relay 516 connects battery through resistor 517 to conductor 553; but neither of relays 550 and 555 is operatively affected since the upper winding of relay 550 is short-circuited through the back contact of relay 514 and the winding of relay 555 is short-circuited through the back contact of relay 550. The impulse of current of frequency F2 immediately following the impulse of current of frequency F1 effects the operation of relay 524. The operation of relay 524 opens the short-circuit across the middle winding of relay 526, to cause the operation of relay 526, and connects ground to conductor 525 to operate relay 823 of two-way trunk circuit TWT—2. The operation of relay 526 causes the release of cut-off relay 604 of line circuit TLC2 and closes a circuit through the middle winding of relay 516 to hold relay 516 operated. The drop in potential through resistor 566 is thereby increased so that the current through resistor 568 and the biasing windings of relays 534 and 550 is decreased. The aforementioned circuit for operating relay 823 is traced from conductor 525 through a back contact of relay 560, conductor 565, a back contact of relay 906 of outgoing trunk circuit OT2, conductor 907, back contact of relay 824 of two-way trunk circuit TWT2, back contact of relay 827 and the winding of relay 823. The operation of relay 823 connects ground to conductor 803 to prevent seizure of the trunk circuit TWT2 by any of the selectors such as TS3 having access thereto. The operation of relay 823 also closes a circuit for operating relay 825 in series with the line relay 857 of selector TS2; this circuit is traced from ground at the front contact of relay 524, through conductor 525, back contact of relay 560, conductor 565, back contact of relay 906, conductor 907, back contact of relay 824, winding of relay 825, a front contact of relay 823 and conductor 916, then in simplex through both windings of retard coil 914, conductors 911 and 912, back contacts of relay 920, conductors 921 and 922, front contacts of relay 823, conductors 851 and 852, back contacts of relay 853 of selector TS2, resistors 855 and 856, another back contact of relay 853 and through the winding of line relay 857. The operation of relay 825 closes a circuit for operating the slow-to-release relay 827 and closes a circuit through resistor 826 for holding relay 823 after relay 827 operates. The operation of relay 827 opens the operating circuit and closes a holding circuit through resistor 826 for relay 823. The operation of relay 827 connects ground to conductor 830 to operatively energize the lower winding of relay 690 of signal transmitter ST2 and to hold the connection which is extended through the selector TS2; and this ground is further connected through a back contact of relay 905 of outgoing trunk circuit OT2 and conductor 561, to the winding of relay 560 of signal receiver SR2 to effect the operation of relay 560. The operation of relay 560 disconnects conductor 564 from ground at the left contact of relay 534, connects this ground to conductor 565 to hold relays 825 and 857 operated, connects ground from the front contact of relay 524 to conductor 563 to energize the lower winding of relay 526, and connects ground to conductor 562. When the impulse of current of frequency F2 ends, relay 524 releases; but relay 560 is held operated until a disconnect signal causes the disconnection of ground from conductor 830 as hereinafter described. The release of relay 524 causes the delayed release of relay 526, the delay being introduced by current charging condenser 527; and the release of relay 526 causes the release of relay 516. The aforementioned operation of relay 857 of selector TS2 closes a circuit for operating the slow-to-release relay 858. Relay 858 connects ground to an alarm circuit to effect the operation of an alarm in case the selective operations of selector TS2 are not completed within a predetermined interval of time. Relay 858 also connects ground to conductor 830 in parallel with the ground connected thereto at the lower front contact of relay 827. The aforementioned operation of relay 690 prepares a locking circuit for relay 620, closes a circuit for operating relay 691, and closes a circuit for operating relay 650. The circuit for operating relay 650 is traced from battery at the outer upper front contact of relay 690, winding of relay 650, a back contact of relay 640, inner lower back contact of relay 630, conductor 562, to ground at a front contact of relay 560. The operation of relay 650 causes the operation of relay 680. With relays 690, 691 and 650 operated, the locking ground for relays 710 and 760 is supplied at the outer lower front contact of relay 650 instead of through back contacts of relays 690 and 691.

When the calling operator dials the digits of the toll route code, and the local office code and called subscriber's number in case the called subscriber's line terminates in a dial office, relay 109 of outgoing trunk circuit OT1 is alternately released and reoperated in response to each dial impulse to effect a corresponding release and reoperation of relay 300 of signal transmitter ST1. The release of relay 300 responsive to the first dial impulse effects the transmission of an enablement signal, which is similar to a seizure signal, followed by an impulse of current of frequency F3 which impulse represents the dial impulse. The enablement signal is effective to prepare the signal receiver SR2 at the other end of the line TL12 for response to the train of dial impulses corresponding to the digit dialed. The release of relay 300 opens the circuit through the winding of the cut-off relay 204 to cause the release of relay 204, and connects the signal current source G1 to transformer 209 to transmit current of frequency F1 over toll line TL12, this connection being traced from source G1, through conductor 315, lowermost front contact of relay 310, upper back contact of relay 300, left contact of relay 325, conductor 211, back contact of relay 210 and the left winding of transformer 209. The release of relay 300 also opens the above-described circuit through the lower winding of relay 320, the operation of relay 320 being delayed for about .020 second by current charging condenser 321. When relay 320 operates, it causes the immediate operation of relay 325 and the delayed operation of relay 330. The operation of relay 325 disconnects source G1 from, and connects source G2 to, conductor 211 and the left winding of transformer 209 thereby to end the transmission of current of frequency F1 and initiate the transmission of current of frequency F2 over toll line TL12. The release of relay 300 also disconnects ground from conductor 301 thereby to open a short-circuit across the winding of relay 380 and thus cause the operation of relay 380 in a circuit traced from battery through the winding of relay 375, resistor 376, lower front contact of relay 375, winding of relay 380, back contact of relay 385, to ground at a front contact of relay 360. Relay 375 is held operated by the current in this circuit. The circuit path through the winding of relay 375, resistor 376 and resistor 371 aids in holding relay 375. The operation of relay 380 opens the connection between conductor 301 and resistor 376, closes a circuit for operating relay 260, closes a circuit for energizing the upper winding of relay 390 to cause the release of relay 390, closes a circuit for operating relay 370, and opens the circuit through the upper winding of relay 385. The operation of relay 260 prevents the reoperation of relay 204 while a train of dial impulses is being transmitted. The release of relay 390 closes a circuit for operating relay 340. The operation of relay 370 opens the circuit path through resistor 371, and connects the winding of relay 350 to conductor 361 so as to hold relay 350 under the joint control of relays 370 and 380 after the operation of relay 340. The energization of the upper winding of relay 385 is maintained by current charging condenser 373 for about .040 second after relay 380 operates, the energization of the lower winding of relay 385 thereupon becoming effective to operate relay 385. The operation of relay 385 causes the release of relays 375 and 380. The release of relay 375 short-circuits resistor 376 and the release of relay 380 reconnects the winding of relay 375 to conductor 301 awaiting the reoperation of relay 300. The release of relay 380 also opens the circuit through the upper winding of relay 390 and causes the release of relay 370. Being slow in releasing, relay 260 remains operated until all of the impulses in the train have been received. The energization of the upper winding of relay 390 is maintained after relay 380 releases by current charging condenser 393; and therefore relay 390 does not operate during dialing unless the dial speed is low. If relay 390 reoperates while relay 375 is released, relay 340 is held operated in a circuit traced through the lowermost front contact of relay 360, the front contact of relay 340, upper back contact of relay 375 and conductor 362 to ground at a front contact of relay 360. With relays 370 and 380 released and relay 340 operated, the circuit for operating relay 350 is opened and relay 350 releases. The release of relay 350 disconnects source G2 from, and connects source G3 to, the left winding of transformer 209 thereby ending the transmission of current of frequency F2 and initiating the transmission of current of frequency F3 over toll line TL12. The connection between source G3 and transformer 209 is traced through the uppermost back contact of relay 240, a front contact of relay 220, conductor 352, lower back contact of relay 350, front contact of relay 325, conductor 211, and back contact of relay 210. The release of relay 370 closes the circuit for energizing the upper winding of relay 385, thereby causing the release of relay 385. Relay 390 reoperates in case the circuit through its upper winding is not again closed before the current charging condenser 393 decays below the value required for maintaining the energization of this winding. When relay 300 reoperates at the end of the first dial impulse, it again connects ground to conductor 301 thereby causing the reoperation of relay 375. The reoperation of relay 300 also recloses the circuit for energizing the lower winding of relay 320 to effect the immediate release of relay 320. The release of relay 320 closes the circuit for energizing the upper winding of relay 330 thereby causing the immediate release of relay 330. The release of relay 320 also opens the circuit through the lower winding of relay 325 but energization of this winding is maintained by current discharging condenser 354, the discharge path including the inner upper back contact of relay 350 and a front contact of relay 310, this current being effective to hold relay 325 operated for about .100 second.

The aforementioned operation of relay 375 opens the locking circuit for relay 340 but relay 340 is held operated through the back contact of relay 390 unless the dial impulse rate is low; in which case the operation of relay 390 causes the release of relay 340 and the release of relay 340 closes the circuit for operating relay 350, thereby to end the transmission of current of frequency F3 by disconnecting source G3 from transformer 209 and to initiate the transmission of frequency F2 by connecting source G2 to transformer 209. If, however, the dial is not a slow dial, relay 390 does not reoperate since the release of relay 300 responsive to the next dial impulse of the train causes the reoperation of relay 380; and relay 380 recloses the circuit through the upper winding of relay 390 to maintain the energization of this winding and thereby prevent the reoperation of relay 390. The reoperation of relay 380 also causes the reoperation of relay 350 thereby disconnecting source G3 from transformer 209 to end the transmission of current of frequency F3 and reconnecting source G2 to transformer 209 to initiate the transmission of current of frequency F2. The reoperation of relay 350 closes a circuit including the lower winding of relay 325 and condenser 353 whereby the operative energization of this winding is maintained by current discharging condenser 353. The release of relay 300 responsive to the second dial impulse of the train also opens the circuit through the lower winding of relay 320, the operation of relay 320 being delayed for about .020 second by current charging condenser 321. The operation of relay 320 again connects ground to conductor 326 to maintain the operative energization of the lower winding of relay 325. The operation of relay 320 also opens the circuit through the upper winding of relay 330, the operation of relay 330 being delayed by current charging condenser 322. The reoperation of relay 380 responsive to the second dial impulse received by relay 300 also causes the reoperation of relay 370; and the reoperation of relay 370 opens the circuit through the upper winding of relay 385, the deenergization of the upper winding and operation of relay 385 being delayed by current charging condenser 373. The operation of relay 385 causes the release of relays 375, 380, 370 and 350. The release of relay 350 disconnects source G2 from, and connects source G3 to, transformer 209 thereby to end the transmission of current of frequency F2 and initiate the transmission of current of frequency F3. When relay 300 reoperates at the end of the second dial impulse, relay 375 is reoperated, relays 320 and 330 are released, the transmission of current of frequency F3 is ended and the transmission of current of frequency F2 initiated in the manner above set forth as resulting from the reoperation of relay 300 at the end of the first dial impulse. Thus an impulse of current of frequency F3 is transmitted for an interval equal to the length of each dial impulse, as indicated by the release of relay 300, and an impulse of frequency F2 is transmitted between succeeding dial impulses; except that in the case of slow dials the transmission of current of frequency F3 is ended and transmission of current of frequency F2 is initiated by the reoperation of relay 350 when relay 340 releases due to the operation of relay 390. When relay 300 operates at the end of the last impulse of a train, relay 375 is reoperated, relay 390 operates, relay 340 releases and relay 350 reoperates; and current of frequency F2 is transmitted until relay 325 releases, the release of relay 325 occurring about .1 second after the reoperation of relay 350, at which time the discharge current from condenser 353 is no longer effective to maintain the operative energization of the lower winding of relay 325. Since relay 380 remains normal, relay 260 releases thereby reclosing the circuit for operating the cut-off relay 204.

When a train of dial impulses is transmitted over toll line TL12 to the signal receiver SR2, relay 514 is operated responsive to the impulse of current of frequency F1, relay 524 is operated responsive to the impulse of current of frequency F2, and then relays 534 and 524 are alternately operated responsive to the alternate impulses of current of frequency F3 and F2 representing each dial impulse of the train. The operation of relay 514 responsive to the impulse of current of frequency F1 causes the energization of the lower winding of relay 516 by current discharging condenser 515, this current being in the biasing direction. The release of relay 514 at the end of the impulse of current of frequency F1 causes the operative energization of the lower winding of relay 516 by current charging condenser 515. The operation of relay 524 responsive to the impulse of current of frequency F2 opens the short-circuit across the middle winding of relay 526 and connects ground through conductor 525, a front contact of relay 560, to conductor 563 to operatively energize the lower winding of relay 526. The operation of relay 526 closes a circuit for energizing the middle winding of relay 516 to hold relay 516 operated after the current charging condenser 515 is insufficient to maintain the energization of the lower winding of relay 516. The operation of relay 526 disconnects ground from conductor 603 to cause the release of cut-off relay 604. When relay 524 releases, it recloses the short-circuit across the upper winding and opens the circuit through the lower winding of relay 526; but the energization of the lower winding of relay 526 is maintained by current charging condenser 527. When relay 534 operates, it disconnects ground from conductor 565, thereby causing the release of relay 825 of two-way trunk circuit and the release of line relay 851 of selector TS2. The operation of relay 534 connects ground to conductor 563 to maintain the operative energization of the lower winding of relay 526. When relay 534 releases at the end of the first impulse of frequency F3, it connects ground to conductor 565 to reoperate relays 825 and 857 and disconnects ground for conductor 563, the energization of the lower winding of relay 526 being maintained by current charging condenser 527. When relay 524 reoperates responsive to the impulse of current of frequency F2 following the impulse of current of frequency F3, it opens the short-circuit across the middle winding of relay 526 and connects ground to conductor 563 to maintain the operation of relay 526. The alternate operation of relays 534 and 524, responsive to alternate impulses of current of frequency F3 and F2, representing succeeding dial impulses of the train, effects the alternate disconnection and reconnection of ground to conductor 565 to alternately release and reoperate relays 825 and 857 and maintains the operative energization of relay 526. The release of relay 524, at the end of the impulse of current of frequency F2 following the impulse of current of frequency F3 representing the last dial impulse of the train, closes the short-circuit across the middle winding of relay 526 and disconnects ground from conductor 563, the release of relay 526 being delayed by current charging condenser 527. When relay 526 releases it reconnects ground to conductor 603 to effect the reoperation of cut-off relay 604.

Each release of relay 825 opens the circuit through the winding of relay 827 but relay 827 is slow in releasing and remains operated during the response of relay 825 to dial impulses. The release of relay 857, in response to the first dial impulse, closes a circuit for operating the vertical stepping magnet 861 and relay 863 in series. The operation of stepping magnet 861 raises the brushes 871, 872, 873 and 874 up to the first level of the bank. The vertical off-normal springs VON are actuated as soon as the shaft on which the brushes are mounted is moved out of normal position. The operation of relay 863 and actuation of springs VON close a circuit for operating relay 865, this circuit including the lower contact of springs VON, the front contact of relay 863 and the outer lower front contact of relay 858. Relay 865 closes a locking circuit which includes the back contact of the rotary stepping magnet 862, the upper front contact of relay 865 and the lowermost back contact of relay 853. When relay 857 reoperates at the end of the first impulse, the stepping magnet 861 releases, but relay 863 is slow in releasing and remains operated until all of the impulses in the train have been received by relay 857. Relay 858 is also slow in releasing and remains operated during the response of relay 857 to dial impulse. Each succeeding release of relay 857 effects the reoperation of stepping magnet 861 thereby stepping the brushes up to the level corresponding to the first digit of the toll route code. When relay 857 remains operated at the end of the last impulse of the train, relay 863 releases closing a circuit through the lower front contact of relay 865 and back contact of relay 863, for operating the rotary stepping magnet 862. The operation of stepping magnet 862 advances the brushes into engagement with the first set of terminals in the selected level and causes the release of relay 865. The release of relay 865 causes the release of stepping magnet 862. If the trunk connected to the first set of terminals is busy, the terminal engaged by test brush 873 is marked by a ground potential connected thereto; and this ground potential is connected through brush 873, a back contact of relay 853, back contact of stepping magnet 862, lower contact of springs VON, to the winding of relay 865. Relay 865 is thereby reoperated to again close the circuit for operating stepping magnet 862 so as to advance the brushes to the next set of terminals. When the brushes engage a set of terminals connected to an idle trunk, the terminal engaged by brush 873 is not marked by ground potential and relay 853 is operated by the current in a circuit traced from battery through the winding of relay 865, lower contact of springs VON, back contact of stepping magnet 862, winding of relay 853, lower contact of the eleventh-rotary-step springs 859, to grounded conductor 830. Being marginal, relay 865 does not reoperate in series with relay 853. The operation of relay 853 disconnects conductors 851 and 852 from the winding of relay 857 and connects these conductors through front contacts of relay 853 and brushes 871 and 872 to the line conductors of the selected trunk or selected auxiliary selector circuit in case more than one stage of toll route selectors are provided. The operation of relay 853 causes the successive release of relays 857 and 858, the operation of relay 853 being maintained as long as relay 827 of two-way trunk circuit TWT2 connects ground to conductor 830. Additional trains of impulses received by the signal receiver SR2 are repeated over conductor 565 to relay 825 of two-way trunk circuit TWT2 and to the line relay of any trunk or selector to which the connection is extended.

Assume that the call in question is one to be completed by an operator in the second toll office. In this case the selector TS2 selects a set of terminals such as the terminals 876 which are connected by conductors 1001, 1002, 1003 and 1004 to an incoming trunk circuit IT2. The operation of relay 853 extends the connection from conductors 851 and 852 through brushes 871 and 872, conductors 1001 and 1002 to effect the operation of the line relay 1005 of trunk circuit IT2 thereby to light an answering lamp in usual manner. When the plug of a cord is inserted in jack J10 to answer the call, the answering lamp is extinguished and a relay 1034 is operated in the manner set forth in the aforementioned King et al. patent. Relay 1034 connects ground to conductor 1004, through brush 874, a front contact of relay 853 of selector TS2, a back contact of eleventh-rotary-step springs 859, to the winding of relay 829 of two-way trunk circuit TWT2. Relay 829 is thereby operated to close a circuit for operating relay 700 of signal transmitter ST2. This circuit includes the front contact of relay 829, back contact of relay 828, conductor 908, back contact of relay 909, conductor 910, and winding of relay 700. The operation of relay 700 causes the transmission of an answering or off-hook supervisory signal consisting of an impulse of current of frequency F4 followed by an impulse of current of frequency F5, the various operations of the signal transmitter ST2 being similar to those of the signal transmitter ST1 in sending a seizure signal as hereinbefore described. The signal receiver SR1 responds to the off-hook supervisory signal, in a similar manner to that in which the signal receiver SR2 responds to a seizure signal as hereinbefore described. The operation of relay 424 is effective to connect ground through conductor 425, a back contact of relay 460, conductor 465, lower front contact of relay 106 of outgoing trunk circuit OT1 to the winding of supervisory relay 105 and the winding of relay 119. Relay 119 operates and locks to ground on conductor 108. The operation of relay 105 disconnects ground from the lower, low resistance winding of relay 104 thereby to extinguish the supervisory lamp SL associated with plug CP1 to indicate that the call has been answered. The operation of relay 105 connects ground to conductor 461 to operate relay 460 of signal receiver SR2. Relay 460 disconnects ground from conductor 464, disconnects conductor 425 from conductor 465, connects conductor 425 to conductor 463, and connects conductor 465 to ground at the back contact of relay 434.

If the answering operator disconnects from jack 510 before the calling operator releases the connection, relay 1034 is released as described in the aforementioned King et al. patent. The release of relay 1034 causes the release of relay 829; and the release of relay 829 causes the release of relay 700 of signal transmitter ST2. At the time that relay 700 releases, relays 604, 620, 650, 670, 671, 680, 690, 691, 710, 750, 760, 775 and 790 are operated. The release of relay 700 causes the transmission of an on-hook supervisory signal consisting of an impulse of current of frequency F4 followed by an impulse of current of frequency F5 followed by an impulse of current of frequency F6 in the same manner that the first impulse of a train of dial impulses is transmitted by the signal transmitter ST1 as hereinbefore described. The transmission of current of frequency F6 is continued since relay 620 is locked under the control of relay 690, until relay 640 is operated as hereinafter described. The signal receiver SR1 responds to the on-hook signal in the same manner that the signal receiver SR2 responds to the first dial impulse of a train, the operation of relay 434 being effective to disconnect ground from conductor 465 to release relay 105 and thereby effect the lighting of the supervisory lamp SL. Relays 119 and 460 remain operated until the connection is released as hereinafter described. The operation of relay 434 also connects ground to conductor 463 to maintain the operative energization of the lower winding of relay 426. As long as relay 426 is held operated, the cut-off relay 204 cannot reoperate and relay 416 is held operated by its middle winding.

If the calling operator wishes to recall the answering operator, relay 109 is momentarily released responsive to the momentary operation of the ringing key of cord CD1 in the manner described in the aforementioned King et al. patent. The momentary release of relay 109 causes a like release of relay 300 whereby a rering signal is transmitted. The rering signal consists of an impulse of current of frequency F1 followed by an impulse of current of frequency F2 followed by an impulse of current of frequency F3 followed by an impulse of current of frequency F2, all of which are transmitted in the same manner as that in which the signal corresponding to a single dial impulse is transmitted. In response to the rering signal, the signal receiver SR2 momentarily disconnects ground from conductor 565 thereby causing the momentary release of relays 825 and 1005 to recall the answering operator in the manner described in detail in the aforementioned King et al. patent.

When the calling operator disconnects plug CP1 from jack J1, the outgoing trunk circuit is restored to normal in the manner described in the aforementioned King et al. patent except that relay 119 remains operated while the disconnect signal is being transmitted. The release of relay 109 causes the release of relay 300 of signal transmitter ST1. The release of relay 300 effects the transmission of an impulse of current of frequency F1 followed by an impulse of current of frequency F2, followed by an impulse of current of frequency F3 in the same manner as upon release of relay 300 in response to the first impulse of a train of dial impulses as hereinbefore described. But relay 300 does not reoperate as it does at the end of a dial impulse; and therefore relay 35 is not reoperated, relay 340 remains operated, and relay 350 is not reoperated. The continued release of relay 375 causes the successive release of relays 270, 271 and 220, the transmission of current of frequency F3 being continued until relay 220 releases, about one second after the release of relay 350. If relay 230 is not operated responsive to a disconnect acknowledgment signal incoming over line TL12 as hereinafter described before relay 220 releases, the release of relay 220 disconnects source G3 from transformer 209 to end the transmission of current of frequency F3 and connects source G2 to transformer 209 to initiate the transmission of current of frequency F2. The release of relay 220 also closes a circuit for energizing the lower winding of relay 320, this circuit being traced through a front contact of relay 310, conductor 242, inner lower back contact of relay 240, uppermost back contact of relay 220, inner upper front contact of relay 360, to ground at the front contact of relay 330. Relay 320 is thereby released, causing the release of relay 325 whereby source G2 is disconnected from transformer 209 to end the transmission of current of frequency F2; and source G1 is connected to transformer 209 to initiate the transmission of current of frequency F1 over line TL12, this connection being traced through conductor 315, lowermost front contact of relay 310, upper back contact of relay 300, back contact of relay 325, conductor 211, and a back contact of relay 210, to transformer 209. The release of relay 320 also causes the energization of the upper winding of relay 330, thereby to effect the immediate release of relay 330. The release of relay 330 causes the deenergization of the lower winding and reoperation of relay 320 after an interval of about .020 second. The operation of relay 320 is followed by the reoperation of relay 325 and the reoperation of relay 330 at the end of a further interval of about .020 second. The reoperation of relay 325 is effective to disconnect source G1 and connect source G2 to transformer 209. Relays 320, 325 and 330 are in this manner alternately released and reoperated to alternately transmit impulses of current of frequencies F2 and F1 over toll line TL12 until a disconnect acknowledgment signal is received by the signal receiver SR1 as hereinafter described.

This disconnect signal transmitted by the signal transmitter ST1 effects the successive operations of relays 514, 524, and 534, responsive to the impulses of current of frequencies F1, F2 and F3; and effects the alternate operation of relays 524 and 514 responsive to the succeeding alternate impulses of frequencies F2 and F1. The release of relay 514, at the end of the first impulse of frequency F1, causes the operation of relay 516; the operation of relay 524, responsive to the first impulse of frequency F2, causes the operation of relay 526; and the operation of relay 534, responsive to the impulse of frequency F3, causes relays 516 and 526 to be held operated and disconnects ground from conductor 565, thereby causing the release of relays 825 and 1005. The release of relay 1005 causes a disconnect signal to be given to the answering operator if the answering cord has not been disconnected from jack J10. If there are no interference currents, the impulse of current of frequency F3 maintains the energization of relay 534 and the release of relay 825 for a long enough interval to cause the release of relay 827. The release of relay 827 causes the release of relay 823 and disconnects ground from conductor 830 thereby to cause the release of relay 853 of selector TS2. The release of relay 853 causes the operation of release magnet 869 to effect the return of selector TS2 to normal in usual and well-known manner. The release of relay 1005 and the disconnection of the answering cord from jack J10 restore the incoming trunk circuit to normal in the manner described in the aforementioned King et al. patent. The aforementioned disconnection of ground from conductor 830 due to the release of relay 827 causes the release of relay 560.

If, at the time that relay 560 releases, the call has not yet been answered or has been answered and the answering operator has disconnected, relays 829 and 700 are normal; but if the call has been answered and the answering operator has not disconnected, relays 829 and 700 are operated, and in this case the aforementioned release of relay 827 causes the successive release of relays 829 and 700. Assume first that the call is one which has not been answered and that relay 560 releases responsive to the impulse of current of frequency F3 of the aforementioned disconnect signal. In this case, relays 690, 691, 650 and 680 are operated, but all other relays of the signal transmitter ST2 are normal, at the time that relay 560 releases. The release of relay 560 disconnects ground from conductor 562; but, since relay 534 is operated, the release of relay 560 does not connect ground to conductor 564 so that the winding of relay 640 is no longer short-circuited and this winding is operatively energized in series with the winding of relay 650. The operation of relay 640 opens the circuit for operating relay 680. Relay 680 is slow in releasing and remains operated for about .040 second after relay 640 operates. The aforementioned disconnection of ground from conductor 998 causes the deenergization of the lower winding of relay 690; but relay 690 is slow in releasing and the operation of relay 640 closes a locking circuit through the upper winding of relay 690 to hold relay 690 operated. Relay 640 closes a circuit for operating relay 760, closes a circuit including the front contact of relay 680 for operating relay 710, and connects source G4 through conductor 643, back contact of relay 725, conductor 611, and inner back contact of relay 610, to the right winding of transformer 609, thereby initiating the transmission of current of frequency F4 over line TL12 to the calling toll office. Relays 760 and 710 lock through conductor 633 and a back contact of relay 630 to ground at a front contact of relay 650. The operation of relay 710 opens the normally closed circuit for energizing the lower winding of relay 720, the operation of relay 720 being delayed for about .020 second by current charging condenser 721. The operation of relay 720 closes a circuit for operatively energizing the lower winding of relay 725. The operation of relay 725 disconnects transformer 609 from source G4 to end the transmission of current of frequency F4 and connects transformer 609 to source G5 to initiate the transmission of current of frequency F5. The connection between transformer 609 and source G5 includes the inner back contact of relay 610, conductor 611, front contact of relay 725, lower back contact of relay 750, conductor 752, a back contact of relay 620, and another back contact of relay 610. The aforementioned operation of relay 720 opens the normally closed circuit through the upper winding of relay 730, the resulting operation of relay 730 being delayed for about .020 second by current charging condenser 722. The operation of relay 730 closes a circuit for energizing the lower winding of relay 720, this circuit being traced through the middle lower front contact of relay 710, conductor 642, inner lower front contact of relay 640, conductor 703, inner upper front contact of relay 760 and the front contact of relay 730. Relay 720 is thereby released, causing the release of relays 725 and 730. The release of relay 725 disconnects source G5 from transformer 609 ending the transmission of current of frequency F5 and reconnects source G4 to transformer 609 to initiate the transmission of current of frequency F4. Relays 720, 725 and 730 are thus cyclically operated and released to effect the transmission of alternate impulses of current of frequencies F4 and F5 as a disconnect acknowledgment signal. When relay 534 releases at the end of the impulse of current of frequency F3 of the disconnect signal transmitted by the signal transmitter ST1, ground is reconnected to conductor 564 thereby short-circuiting the winding and causing the release of relay 640. Since ground has been disconnected from conductor 830 due to the release of relay 827 of two-way trunk circuit TWT2, the release of relay 640 causes the release of relay 690. The release of relay 690 causes the release of relays 691 and 650. The release of relay 650 prevents the operation of relay 680 and, since relay 691 is slow in releasing, causes the release of relays 710 and 760, relay 760 being slow in releasing. With relay 640 normal, the release of relay 710 disconnects source G4 from transformer 609; and, with both of relays 700 and 710 normal, relays 720 and 725 are normal so that source G5 is disconnected from transformer 609; and, therefore, the transmission of the disconnect-acknowledgment signal is ended. The release of relay 710 closes the normally closed circuit for operating the cut-off relay 604.

Assume now that the call is one which has been answered, that the answering operator has not disconnected and that relay 560 is released and selector TS2 restored to normal in response to the impulse of current of frequency F3 of the aforementioned disconnect signal. At the time that relay 560 releases, relays 620, 650, 670, 671, 680, 690, 691, 700, 710, 750, 760, and 775 of signal transmitter ST2 are operated and the other relays of this transmitter are normal. The release of relay 853 of selector TS2, when relay 827 of two-way trunk circuit TWT2 releases, causes the successive release of relay 829 of trunk circuit TWT2 and relay 700 of signal transmitter ST2. The release of relay 560 disconnects ground from conductor 562 thereby causing the operative energization of the winding of relay 640 in series with the winding of relay 650. Although the release of relay 827 of two-way trunk circuit TWT2 effects the deenergization of the lower winding of relay 690, relay 690 is slow in releasing and the operation of relay 640 closes a locking circuit through the upper winding of relay 690 to hold relay 690 operated. The release of relay 700 causes the release of relay 775, operation of relay 780, release of relay 790, operation of relay 770, operation of relay 740 and release of relay 750 in the same manner as above described when relay 700 releases to effect the transmission of an on-hook signal to the calling operator. The release of relay 775 causes the release of relays 670 and 671 but relay 620 is held operated by relay 690. The operation of relay 640 immediately connects source G4 to the back contact of relay 725 thereby initiating the transmision of current of frequency F4 over line TL12 to the calling office. The release of relay 700 and operation of relay 640 open the circuit for energizing the lower winding of relay 720, thereby causing the delayed operation of relay 720. When relay 720 operates, it causes the immediate operation of relay 725 and delayed operation of relay 730. The operation of relay 725 ends the transmission of current of frequency F4 and initiates the transmission of current of frequency F5, source G5 being connected through the uppermost front contact of relay 640, inner upper front contact of relay 620, conductor 752, and lower back contact of relay 750 to the front contact of relay 725. Relays 720, 725 and 730 are cyclically operated and released to effect the transmission of alternate impulses of frequencies F4 and F5 as a disconnect-acknowledgment signal. When the impulse of current of frequency F3 incoming over line TL12 ends, the release of relay 534 connects ground to conductor 564 to release relay 640. The release of relay 640 causes the release of relay 690 and the release of relay 690 causes the release of relays 620, 691 and 650. The release of relay 650 causes the release of relays 710 and 760, thereby ending the transmission of the disconnect-acknowledgment signal. The release of relay 710 also causes the reoperation of cut-off relay 604.

Assume next that the call is one which has been answered, that the answering operator has disconnected and that relay 560 releases responsive to the impulse of current of frequency F3 of the aforementioned disconnect signal. In this case relays 620, 650, 680, 690, 691, 710, 720, 725, 730, 740 and 760 of signal transmitter ST2 are operated at the time that relay 560 releases. Relays 670, 671 and 660 will also be operated in case current of frequency F6 is being transmitted by signal transmitter ST2 as part of an on-hook signal at the time that relay 560 releases. The cut-off relay 604 will be released while an on-hook signal is being transmitted by signal transmitter ST2 and will be released due to the operation of relay 526 during receipt of the disconnect signal by signal receiver SR2. The release of relay 560 disconnects ground from conductor 562 to cause the operation of relay 640. The operation of relay 640 disconnects source G6 from the front contact of relay 725, connects source G5 to the front contact of relay 725 and connects source G4 to the back contact of relay 725. Thus the operation of relay 640 ends the transmission of current of frequency F6 and initiates the transmission of current of frequency F5. The operation of relay 640 also closes the circuit for energizing the lower winding of relay 720 to cause the release of relay 720. The release of relay 720 causes the release of relays 725 and 730; and these three relays are cyclically operated and released to transmit alternate impulses of frequencies F4 and F5 over line TL12 to the calling office as a disconnect-acknowledgment signal until relay 640 releases responsive to the ending of the impulse of current of frequency F3 incoming over line TL12 from the calling office.

Assume now that the impulse of current of frequency F3 incoming over line TL12 as a disconnect signal is ineffective to cause the operation of relay 534 for a long enough interval to effect the release of relay 827 of two-way trunk circuit TWT2. In this case relay 560 is not released and relays 524 and 514 are alternately operated responsive to the alternate impulses of frequencies F2 and F1 transmitted by signal transmitter ST1 as hereinbefore described. Relays 526 and 516 are held operated during receipt of these impulses. The operation of relay 514 by the first impulse of frequency F1, following the impulse of frequency F3, opens the short-circuit across the upper winding of relay 550 and this winding is energized in series with resistor 552, conductor 553 and the front contact of relay 516. The operation of relay 550 opens the short-circuit across the winding of relay 555, thereby causing the operation of relay 555. The operation of relay 555 connects ground to conductor 556 to operate relay 630 of signal transmitter ST2. When relay 514 releases, it again short-circuits the winding of relay 550, and relay 550 releases; but relay 555 remains operated as long as relay 516 is held operated responsive to incoming signal current impulses. The operation of relay 630 opens the short-circuit across the winding of relay 640 to cause the operation of relay 640 in series with relay 650. The operations of relays 640 and 630 connect the locking winding of relay 690 through conductor 562 to ground at a front contact of relay 560. The operation of relay 640 causes the transmission of a disconnect-acknowledgment signal in the manner described above.

When the alternate impulses of current of frequencies F4 and F5, which are transmitted by the signal transmitter ST2, as a disconnect-acknowledgement signal are received by signal receiver SR1 at the calling end of toll line TL12, relays 414 and 424 are alternately operated. The operation of relays 414 and 424 causes corresponding operation of relays 416 and 426 in the same manner that relays 516 and 526 of signal receiver SR2 are operated responsive to incoming signals as hereinbefore described. The operation of relay 426 holds relay 416 and the next succeeding operation of relay 414 opens the short-circuit across the upper winding of relay 450 to cause the operation of relay 450. The operation of relay 450 opens the short-circuit across the winding of relay 455 so that relay 455 operates. When relay 414 releases, relay 450 releases due to the short-circuiting of its upper winding but relay 455 remains operated since the release of relay 450 does not again close the short-circuit across the winding of relay 455. The operation of relay 455 connects ground to conductor 456 to operate relay 230. The operation of relay 230 opens the locking circuit for relays 310 and 360. Relay 310 releases but relay 360 remains operated if the operation of relay 230 occurs before relay 220 has released. The release of relay 310 closes the normally closed circuit for energizing the lower winding of relay 320 thereby effecting the release of relay 320. The release of relay 320 causes the release of relays 325 and 330. The release of relay 325 disconnects source G3 from transformer 209 ending the transmission of current of frequency F3. When relay 220 releases, the cut-off relay 204 is reoperated.

If the disconnect acknowledgement signal is not received by signal receiver SR1 before relay 220 of signal transmitter ST1 has released, the release of relay 220 ends the transmission of current of frequency F3 and initiates the transmission of current of frequency F2; and impulses of current of frequencies F2 and F1 are alternately transmitted as above described until the disconnect acknowledgment signal is received. When relay 230 is operated, responsive to the disconnect-acknowledgment signal, it closes a circuit for operating relay 210; this circuit is traced through the outer lower back contact of relay 240, inner upper back contact of relay 220, upper front contact of relay 230, and back contacts of relays 291 and 290. The operation of relay 210 ends the transmission of current of either of frequencies F1 and F2 and connects source G3 to transformer 209 to effect the transmission of an impulse of current of frequency F3 over toll line TL12. The operation of relay 210 also connects ground to conductor 108 to mark the associated trunk circuits busy and hold relay 119 operated until disconnection is completed. The aforementioned operation of relay 230 disconnects ground from conductor 233 to release relay 310 and thereby end the cyclic operation of relays 320, 325, and 330. The transmission of current of frequency F3 continues as long as the disconnect-acknowledgment signal is being received from the signal transmitter ST2.

The current of frequency F3, transmitted by signal transmitter ST1 immediately following the transmission of current of frequency F1 or F2 responsive to the disconnect-acknowledgment signal received by signal receiver SR1, causes the operation of relay 534 of signal receiver SR2 while the signal transmitter ST2 is transmitting alternate impulses of current of frequencies F4 and F5. The operation of relay 534 disconnects ground from conductor 565 to cause the release of the connection in the same manner that it is effected responsive to the first impulse of current of frequency F3 transmitted as a result of the release of the connection by the calling operator as hereinbefore described. The release of relay 560 disconnects ground from conductor 562 thereby opening the circuit through the locking winding of relay 690, relay 690 releases. The release of relay 690 causes the release of relays 691, 650, 640 and 620. The release of relay 640 causes the release of relays 710 and 760 thereby to end the transmission of the disconnect-acknowledgment signal as hereinbefore described. When the disconnect-acknowledgment signal is ended, relays 416 and 426 of signal receiver SR1 release. The release of relay 416 causes the successive release of relays 455, 230 and 210. The release of relay 210 ends the transmission of current of frequency F3. The release of relay 426 causes the reoperation of cut-off relay 204.

What is claimed is:

1. In a signaling system, a signal transmitter adapted to transmit signals consisting of a plurality of impulses of alternating current, each impulse consisting of current of only one of three different frequencies within the voice frequency range, said transmitter comprising means including relays for transmitting seizure and supervisory signals each consisting of an impulse of current of a first one of said frequencies followed by an impulse of current of a second one of said frequencies, and means including relays for transmitting an enablement signal followed by a train of dial impulse signals, said enablement signal being similar to said seizure signal and each dial impulse signal consisting of an impulse of current of said third frequency followed by an impulse of current of said second frequency.

2. In a signaling system, a signal transmitter adapted to transmit signals consisting of a plurality of impulses of alternating current, each impulse consisting of current of only one of three different frequencies within the voice frequency range, said transmitter comprising means including relays for transmitting seizure and supervisory signals each consisting of an impulse of current of a first one of said frequencies followed by an impulse of current of a second one of said frequencies, means including relays for transmitting an enablement signal followed by a train of dial impulse signals, said enablement signal being similar to said seizure signal and each dial impulse signal consisting of an impulse of current of said third frequency followed by an impulse of current of said second frequency, and means including relays for transmitting disconnect and supervisory signals each consisting of said enablement signal followed by an impulse of current of said third frequency for a predetermined interval of time.

3. In a signaling system, a signal transmitter adapted to transmit signals consisting of a plurality of impulses of alternating current, each impulse consisting of current of only one of three different frequencies within the voice frequency range, said transmitter comprising means including relays for transmitting seizure and supervisory signals each consisting of an impulse of current of a first one of said frequencies followed by an impulse of current of a second one of said frequencies, means including relays for transmitting an enablement signal followed by a train of dial impulse signals, said enablement signal being similar to said seizure signal and each dial impulse signal consisting of an impulse of current of said third frequency followed by an impulse of current of said second frequency, and means including relays for transmitting disconnect and supervisory signals each consisting of said enablement signal followed by an impulse of current of said third frequency followed by alternate impulses of current of said second and first frequencies.

4. In a signaling system, a signal transmitter adapted to transmit signals consisting of a plurality of impulses of alternating current, each impulse consisting of current of only one of three different frequencies within the voice frequency range, said transmitter comprising means including relays for transmitting seizure and supervisory signals each consisting of an impulse of current of a first one of said frequencies followed by an impulse of current of a second one of said frequencies, means including relays for transmitting an enablement signal followed by a train of dial impulse signals, said enablement signal being similar to said seizure signal and each dial impulse signal consisting of an impulse of current of said third frequency followed by an impulse of current of said second frequency, means including relays for transmitting disconnect and supervisory signals each consisting of said enablement signal followed by an impulse of current of said third frequency followed by alternate impulses of current of said second and first frequencies, and means including relays for ending the transmission of alternate impulses of current of said second and first frequencies and for transmitting an impulse of current of said third frequency.

5. In a signaling system, a signal transmitter adapted to transmit signals consisting of a plurality of impulses of alternating current, each impulse consisting of current of only one of three different frequencies within the voice frequency range, said transmitter comprising means including relays for transmitting seizure and supervisory signals each consisting of an impulse of current of a first one of said frequencies followed by an impulse of current of a second one of said frequencies, means including relays for transmitting an enablement signal followed by a train of dial impulse signals, said enablement signal being similar to said seizure signal and each dial impulse signal consisting of an impulse of current of said third frequency followed by an impulse of current of said second frequency, means including relays for transmitting disconnect and supervisory signals each consisting of said enablement signal followed by an impulse of current of said third frequency, and means including relays for transmitting a disconnect-acknowledgment signal consisting of alternate impulses of current of said first and second frequencies for a predetermined interval of time.

6. In a signaling system, a line, and signal transmitting means associated with said line, said signal transmitting means comprising a plurality of sources of current, each source of a different frequency, signal relays responsive to a train of dial impulses to be transmitted over said line, means including relays controlled by the release of one of said signal relays in response to the first dial impulse of a train for effecting the transmission over said line of an enablement signal consisting of an impulse of current from a first one of said sources immediately followed by an impulse of current from a second one of said sources, and means including a relay operatively responsive to each release and reoperation of another of said signal relays, the release of the last-mentioned relay being effective to end the transmission of current from said second source and cause the transmission of an impulse of current from the third of said sources, and the reoperation of said last-mentioned relay being effective to end the transmission of current from said third source and initiate the transmission of current from said second source.

7. In a signaling system, a line, and signal transmitting means associated with said line to transmit signals over said line, said signal transmitting means comprising a plurality of sources of current, each source of a different frequency, signal relays responsive to signals which are to be transmitted over said line, means comprising relays responsive to the initial operation of said signal responsive relays for transmitting a first signal over said line consisting of an impulse of current of a first signaling frequency followed by an impulse of current of a second signal frequency, and means including said sources and relays responsive to the release of said signal responsive relays for effecting the transmission of a preparatory or enablement signal similar to said seizure signal followed by an impulse of current of a third signaling frequency.

8. In a signaling system, a line, and signal transmitting means associated with said line to transmit signals over said line, said signal transmitting means comprising a plurality of sources of current, each source of a different frequency, signal relays responsive to signals which are to be transmitted over said line, means comprising relays responsive to the initial operation of said signal responsive relays for transmitting a first signal over said line consisting of an impulse of current of a first signaling frequency followed by an impulse of current of a second signal frequency, and means including said sources and relays responsive to the release of said signal responsive relays for effecting the transmission of a preparatory or enablement signal similar to said seizure signal followed by an impulse of current of a third signaling frequency and responsive to the reoperation of said signal responsive relays following a momentary release of said signal responsive relays for effecting the transmission of an impulse of current of said second signaling frequency following the impulse of current of the third signaling frequency.

9. In a signaling system, a line, and signal transmitting means associated with said line to transmit signals over said line, said signal transmitting means comprising a plurality of sources of current, each source of a different frequency, signal relays responsive to signals which are to be transmitted over said line, means comprising relays responsive to the initial operation of said signal responsive relays for transmitting a first signal over said line consisting of an impulse of current of a first signaling frequency followed by an impulse of current of a second signal frequency, and means including said sources and relays responsive to the release of said signal responsive relays for effecting the transmission of a preparatory or enablement signal similar to said seizure signal followed by an impulse of current of a third signaling frequency and responsive to the reoperation of said signal responsive relays following a momentary release of said signal responsive relays for effecting the transmission of an impulse of current of said second signaling frequency following the impulse of current of the third signaling frequency and responsive to each succeeding release and reoperation of said signal responsive relays in a succession corresponding to a train of dial impulses for effecting the transmission of an impulse of current of said third signaling frequency followed by an impulse of current of said second signaling frequency.

10. In a signaling system, a line, and signal transmitting means associated with said line to transmit signals over said line, said signal transmitting means comprising a plurality of sources of current, each source of a different frequency, signal relays responsive to signals which are to be transmitted over said line, means comprising relays responsive to the initial operation of said signal responsive relays for transmitting a first signal over said line consisting of an impulse of current of a first signaling frequency followed by an impulse of current of a second signal frequency, means including said sources and relays responsive to the release of said signal responsive relays for effecting the transmission of a preparatory or enablement signal similar to said seizure signal followed by an impulse of current of a third signaling frequency and responsive to the reoperation of said signal responsive relays following a momentary release of said signal responsive relays for effecting the transmission of an impulse of current of said second signaling frequency following the impulse of current of the third signaling frequency and responsive to each succeeding release and reoperation of said signal responsive relays in a succession corresponding to a train of dial impulses for effecting the transmission of an impulse of current of said third signaling frequency followed by an impulse of current of said second signaling frequency, and means effective if the release of said signal responsive relays continues for a predetermined interval of time to end the transmission of the impulse of current of said third frequency and initiate the transmission of alternate impulses of current of said first and second frequencies.

11. In a signaling system, a line, and signal transmitting means associated with said line to transmit signals over said line, said signal transmitting means comprising a plurality of sources of current, each source of a different frequency, signal relays responsive to signals which are to be transmitted over said line, means comprising relays responsive to the initial operation of said signal responsive relays for transmitting a first signal over said line consisting of an impulse of current of a first signaling frequency followed by an impulse of current from a second signal frequency, means including said sources and relays responsive to the release of said signal responsive relays for effecting the transmission of a preparatory or enablement signal similar to said seizure signal followed by an impulse of current of a third signaling frequency and responsive to the reoperation of said signal responsive relays following a momentary release of said signal responsive relays for effecting the transmission of an impulse of current of said second signaling frequency following the impulse of current of the third signaling frequency and responsive to each succeeding release and reoperation of said signal responsive relays in a succession corresponding to a train of dial impulses for effecting the transmission of an impulse of current of said third signaling frequency followed by an impulse of current of said second signaling frequency, means effective if the release of said signal responsive relays continues for a predetermined interval of time to end the transmission of the impulse of current of said third frequency and initiate the transmission of alternate impulses of current of said first and second frequencies, and means for ending the transmission of alternate impulses of current of said first and second frequencies and for transmitting an impulse of current of said third frequency.

12. In a signaling system, a line, a signal transmitter for transmitting signals including trains of dial impulse signals over said line, said transmitter comprising a first relay, said first relay responsive to signals which are to be transmitted over said line, a second relay, said second relay operated responsive to the operation of said first relay, means for delaying for a predetermined interval of time the operation of said second relay responsive to the operation of said first relay without delaying the release of said second relay responsive to the release of said first relay, means responsive to the operation of said first relay for initiating the transmission over said line of an impulse of current of a first one of three signaling frequencies, a third relay, said third relay operated responsive to the operation of said second relay to end the impulse of current of said first frequency and initiate the transmission over said line of an impulse of current of a second one of said signaling frequencies, a fourth relay, said fourth relay operatively controlled by said second relay, means for delaying for a predetermined interval of time the operation of said fourth relay, means operated responsive to the operation of said fourth relay for effecting the successive release of said second, third and fourth relays and ending the impulse of current of said second frequency, means responsive to the release of said first relay for initiating the transmission over said line of an impulse of current of said first frequency and causing the successive operation of said second, third and fourth relays, the operation of said third relay being effective to end the impulse of current of said first frequency and initiate the transmission over said line of an impulse of current of said second frequency, relay means controlled by said first relay effective responsive to the release of said first relay to end the impulse of current of said second frequency and initiate the transmission over said line of current of the third of said frequencies and effective responsive to the reoperation of said first relay to end the current of said third frequency and initiate the transmission over said line of current of said second frequency, means including said third relay effective responsive to the continued operation of said first relay to end the current of said second frequency, and means effective responsive to the continued release of said first relay to end the current of said third frequency.

13. In a signaling system according to claim 12, means including said third and fourth relays effective responsive to the continued release of said first relay to transmit over said line impulses of said second and first frequencies alternately following said current of the third frequency.

14. In a signaling system according to claim 12, means including said third and fourth relays effective responsive to the continued release of said first relay to transmit over said line impulses of said second and first frequencies alternately following said current of the third frequency, and relay means for ending the transmission of impulses of current of said second and first frequencies and for effecting the transmission of an impulse of said third frequency over said line.

JOHN G. WALSH.